US010294818B2

(12) United States Patent
Hüning et al.

(10) Patent No.: US 10,294,818 B2
(45) Date of Patent: May 21, 2019

(54) GAS TURBINE HAVING AN ANNULAR PASSAGE SUBDIVIDED INTO ANNULUS SECTORS

(71) Applicant: Siemens Aktiengesellschaft, Munich (DE)

(72) Inventors: Marcus Hüning, Mülheim an der Ruhr (DE); Otmar Gossmann, Engelskirchen (DE); Uwe Kahlstorf, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 15/503,543

(22) PCT Filed: Aug. 12, 2015

(86) PCT No.: PCT/EP2015/068570
§ 371 (c)(1),
(2) Date: Feb. 13, 2017

(87) PCT Pub. No.: WO2016/026752
PCT Pub. Date: Feb. 25, 2016

(65) Prior Publication Data
US 2017/0234156 A1 Aug. 17, 2017

(30) Foreign Application Priority Data
Aug. 21, 2014 (EP) .................................... 14181724

(51) Int. Cl.
*F01D 25/14* (2006.01)
*F01D 19/00* (2006.01)

(52) U.S. Cl.
CPC ............. *F01D 25/14* (2013.01); *F01D 19/00* (2013.01); *F05D 2260/201* (2013.01); *Y02T 50/676* (2013.01)

(58) Field of Classification Search
CPC .......... F01D 19/00; F01D 25/14; F01D 11/24; F01D 25/08; F01D 25/24; F01D 25/26; F05D 2260/201
(Continued)

(56) References Cited

U.S. PATENT DOCUMENTS 2,402,841 A * 6/1946 Ray ......................... F01D 11/24 415/116
4,069,662 A * 1/1978 Redinger, Jr. .......... F01D 11/24 60/226.1
(Continued)

FOREIGN PATENT DOCUMENTS

EP 1505261 A1 2/2005
EP 2574732 A2 4/2013
(Continued)

OTHER PUBLICATIONS

CN Office Action dated Sep. 4, 2017, for CN patent application No. 201580044772.8.
(Continued)

*Primary Examiner* — Marguerite J McMahon
*Assistant Examiner* — Teuta B Holbrook
(74) *Attorney, Agent, or Firm* — Beusse Wolter Sanks & Maire

(57) ABSTRACT

A gas turbine having at least one inner and outer housing part, between which two housing parts a ring channel is at least partially arranged, which ring channel circumferentially surrounds the useful flow of the working fluid prevailing during operation of the gas turbine and circumferentially surrounds the gas turbine rotor. The ring channel is designed to conduct a cooling fluid in the circumferential direction, wherein the ring channel is divided into ring sectors in the circumferential direction by separators. A tube is at least partially provided in the ring channel which
(Continued)

fluidically connects individual ring sectors to each other, and is designed as a distributing tube, which is fluidically connected to at least one cooling-fluid line for conducting cooling fluid and has at least one outlet opening, which at least one outlet opening is designed to transfer the cooling fluid from the tube into the ring sectors.

15 Claims, 6 Drawing Sheets

(58) Field of Classification Search
USPC .......................................... 415/116, 177, 201
See application file for complete search history.

(56) References Cited

U.S. PATENT DOCUMENTS

| | | | | | |
|---|---|---|---|---|---|
| 4,631,913 | A | 12/1986 | Kreitmeier | | |
| 5,100,291 | A * | 3/1992 | Glover | F01D 11/24 | 165/169 |
| 5,205,115 | A * | 4/1993 | Plemmons | F01D 11/24 | 415/115 |
| 5,219,268 | A | 6/1993 | Johnson | | |
| 5,281,085 | A * | 1/1994 | Lenahan | F01D 11/24 | 415/116 |
| 5,385,013 | A * | 1/1995 | Barron | F01D 25/14 | 415/116 |
| 5,504,547 | A | 7/1996 | Cole | | |
| 5,540,547 | A * | 7/1996 | Cole | F01D 11/24 | 24/339 |
| 5,547,013 | A * | 8/1996 | Sherwood | B22D 11/0634 | 164/416 |
| 6,149,074 | A * | 11/2000 | Friedel | F01D 11/24 | 165/169 |
| 7,503,179 | B2 * | 3/2009 | Estridge | F01D 11/24 | 415/108 |
| 7,597,537 | B2 * | 10/2009 | Bucaro | F01D 11/24 | 415/136 |
| 9,752,451 | B2 * | 9/2017 | Blaney | F01D 11/24 | |
| 2001/0022933 | A1 | 9/2001 | Bangert et al. | | |
| 2002/0150467 | A1 * | 10/2002 | Tanioka | F01D 11/24 | 415/115 |
| 2005/0042080 | A1 | 2/2005 | Gendraud et al. | | |
| 2009/0053035 | A1 * | 2/2009 | Zhang | F01D 11/24 | 415/1 |
| 2012/0243970 | A1 | 9/2012 | Hellgren et al. | | |
| 2013/0058760 | A1 * | 3/2013 | Puerta | F04D 27/0215 | 415/116 |
| 2013/0084162 | A1 * | 4/2013 | Sano | F01D 11/24 | 415/116 |
| 2013/0156541 | A1 * | 6/2013 | Eleftheriou | F01D 11/20 | 415/1 |

FOREIGN PATENT DOCUMENTS

| | | | |
|---|---|---|---|
| GB | 2017826 | A | 10/1979 |
| JP | S63154806 | A | 6/1988 |
| JP | 2002285803 | A | 10/2001 |
| JP | 2002523661 | A | 7/2002 |
| JP | 2002285803 | A | 10/2002 |

OTHER PUBLICATIONS

EP Search Report dated Feb. 20, 2015, for EP patent application No. 14181724.7.
International Search Report dated Nov. 23, 2015, for PCT application No. PCT/EP2015/068570.
IPPR (PCT/IPEA/416 and 409) dated Jul. 21, 2016, for PCT application No. PCT/EP2015/068570.

* cited by examiner

GAS TURBINE HAVING AN ANNULAR PASSAGE SUBDIVIDED INTO ANNULUS SECTORS

CROSS REFERENCE TO RELATED APPLICATIONS

This application is the US National Stage of International Application No. PCT/EP2015/068570 filed Aug. 12, 2015, and claims the benefit thereof. The International Application claims the benefit of European Application No. EP14181724 filed Aug. 21, 2014. All of the applications are incorporated by reference herein in their entirety.

FIELD OF INVENTION

The present invention relates to a gas turbine having at least one inner casing part and at least one outer casing part, between which both casing parts is at least partially arranged an annular passage which encloses the useful flow of the working fluid, which prevails during operation of the gas turbine, and the gas turbine rotor, wherein the annular passage is designed to direct a cooling fluid, especially compressor air.

BACKGROUND OF INVENTION

Such gas turbines are typically designed as stationary gas turbines but also as aero engines which have metal casing parts which have a large thermal capacity and therefore also a high heat storage capability. In the casing parts, provision is typically made for discharge openings which are designed to direct the cooling fluid from the annular passage to further fluidically connected sections of the gas turbine for additional cooling and sealing purposes. Furthermore, the cooling fluid naturally also serves for thermal conditioning, i.e. for cooling the components which delimit the annular passage.

Depending on the operating condition of the gas turbine, it is necessary to feed the annular passage only with a comparatively small quantity of cooling fluid. This consequently leads to free convection cells being able to form in the annular passage, which convection cells are formed inside the annular passage on account of the temperature differences. The free convection cells have in turn a significant influence on the overall flow in the annular passage so that sometimes undesirable asymmetries are formed in the cooling fluid distribution in the annular passage. Therefore, increasingly local regions, which are hotter than other regions, are formed inside the annular passage. As a result of the temperature inhomogeneity in the temperature distribution, the geometries of the gas turbine can be distorted on account of the different material expansions of the individual local regions.

On account of this distortion, a loss of axial symmetry of the gas turbine can be the consequence, as a result of which the gap distances between the rotating and static components of the gas turbine over the cross-sectional inside circumference in the longitudinal direction of the gas turbine are different. So, it is known, for example, that on account of the uneven temperature distribution inside the gas turbine during the start-up process an ovalization or a warping of the entire casing can occur.

Moreover, the convective distribution of the cooling fluid in the annular passage provides for different cooling fluid temperatures over the circumference of the annular passage. As a result, however, variable cooling fluid temperatures ensue on those sections of the gas turbine on which additional cooling functions are to be performed by the cooling fluid, like in the case of turbine blade cooling which is fed from the annular passage. As a consequence, it may be required that these sections have to be designed for increased cooling fluid consumption, which is technically necessary to avoid.

Accordingly, the components in the gas turbine are always to be designed for the most unfavorable geometric case, as a result of which an efficiency loss or cost increase is to be added in.

Such problems are typically ignored in the case of most gas turbines and the efficiency losses or cost increase are tolerated. Especially tolerated is the fact that the gap distances between the inner casing part and the rotating components are larger than they might be, specifically when the gas turbine would not be subjected to distortion or warping.

Some attempts for avoiding these problems are already known from the prior art, for example from EP1505261A1, which gives instruction to subdivide the annular passage in the circumferential direction into zones which are fluidically separated from each other.

This fluidic subdivision enables the forming of free convection cells over the entire annular passage to be at least partially prevented, or even completely prevented. Comparable technical provisions are known for example from GB 2,017,826 A, U.S. Pat. No. 5,219,268 A or 4,631,913 A. A disadvantage of this fluidic subdivision of the annular passage into zones is, however, that the individual annulus sectors have to be expensively fed with cooling fluid from the outside and all the sectors require a feed line in each case. Moreover, the fluidic separation of individual sectors proves to be problematic to the extent that individual sectors may require different cooling capacity. As a consequence, different quantities of cooling fluid per time unit are to be fed to the sectors, as a result of which the expenditure on open-loop and closed-loop control is also significantly increased.

SUMMARY OF INVENTION

Under these circumstances, a technical requirement arises for avoiding these disadvantages from the prior art. It is therefore an object of the present invention to do this in a precise manner. Especially to be proposed is a gas turbine which can enable a more uniform cooling of the inner casing parts and particularly of the annular passage in a simple and cost-effective manner. In addition, forming of free convection cells which permeate large regions of the annular passage is to be avoided, but at the same time an advantageous distribution of cooling fluid in the annular passage is to be achieved.

These objects upon which the invention is based are achieved by means of a gas turbine according to the claims.

The objects upon which the invention is based are especially achieved by means of a gas turbine having at least one inner casing part and at least one outer casing part, between which both casing parts is at least partially arranged an annular passage which circumferentially encloses the useful flow of the working fluid, which prevails during operation of the gas turbine, and the gas turbine rotor, wherein the annular passage is designed to direct a cooling fluid, especially compressor air, in the circumferential direction, and wherein the annular passage is subdivided into annulus sectors in the circumferential direction by means of partitions, wherein provision is made at least partially in the annular passage for a pipe which fluidically interconnects individual annulus sectors and wherein the pipe is designed as a distribution pipe which is fluidically connected to at least one cooling fluid feed line for cooling fluid feed and has at least one outlet opening, advantageously a multiplicity of outlet openings, which is, or are, designed for the transfer of cooling fluid from the pipe into the annulus sectors.

This subdivision of the annular passage is to be understood in the sense of a fluidic subdivision which can prevent a free, that is to say unhindered, fluid exchange between the individual annulus sectors.

The outer casing part of a gas turbine typically delimits this toward the environment and prevents the escape of working fluid from the gas turbine into this environment during operation of said gas turbine. The inner casing part on the other hand delimits the gas turbine toward the hot gas flow which is used as working fluid for the conversion of thermal energy into mechanical rotational energy. The inner casing part in this case at least partially encloses the hot gas flow and also the gas turbine rotor.

The annular passage is typically designed as a secondary fluid plenum in which secondary fluid or cooling fluid can be stored and especially directed in the circumferential direction. The cooling fluid is advantageously compressor air but can also be another fluid which would be compressed accordingly. Such fluids are for example air-water mixtures or else air-steam mixtures.

According to the invention, it is provided that the annular passage which is arranged between the inner casing part and outer casing part is fluidically subdivided so that individual annulus sectors are formed.

This fluidic subdivision enables the suppression or even prevention of free convection cells forming over the entire annular passage. As a result of this, the effect of free convection cells on the cooling fluid flow which otherwise prevails in the annular passage can also be reduced. In other words, the influence of the free convection cells in the annular passage is less on the fluid flow which prevails in the annular passage than without subdivision.

Furthermore, local free convection cells, which can ensure a quicker mixing-through of the cooling fluid, can be formed in the individual annulus sectors. Also, the cooling fluid and therefore the cooling capacity of the cooling fluid can be deposited more quickly in the region of the individual annulus sectors so that the consequence is a more efficient cooling by means of the cooling fluid. As a result of the annulus sectors, the natural dynamics of a thermal stratification which are defined by the free convection cells are therefore locally limited which leads to an improved and more uniform temperature distribution over the circumference of the annular passage. Ovalization or warping on account of an uneven temperature distribution in the circumferential direction can therefore be noticeably reduced at least in the region of the annular passage.

According to a further aspect of the invention, it is provided that provision is at least partially made in the annular passage for a pipe which fluidically interconnects individual annulus sectors. This fluidic connection can benefit the fluidic exchange between individual annulus sectors. In this way, cooling fluid and therefore heat can for example also be exchanged between the individual annulus sectors in a directed manner. This especially proves to be advantageous when during operation of the gas turbine individual annulus sectors demand higher cooling capacity than others. In such cases, some cooling fluid can transfer from other annulus sectors over into an affected annulus sector. At the same time, it is also possible that cooling fluid flows out of the hotter annulus sectors, with equal cooling fluid quantity in the individual annulus sectors, into the adjacent annulus sectors on account of the higher pressure which prevails in the hotter annulus sectors.

According to the invention, it is furthermore provided that the pipe is designed as a distribution pipe which is fluidically connected to at least one cooling fluid line for cooling fluid feed and has at least one outlet opening, advantageously a multiplicity of outlet openings, which is, or are, designed for the transfer of cooling fluid from the pipe into the annulus sectors. The pipe especially extends around the entire circumference of the annular passage and distributes the cooling fluid into all the annulus sectors. The pipe therefore enables a homogenous distribution and feed of the annulus sectors with cooling fluid and in this respect contributes in turn to a homogenization of the temperature distribution over the individual annulus sectors in the annular passage.

The feeding of the annulus sectors is therefore carried out via an integrated pipe so that a costly connection of individual annulus sectors to a feed line system from the outside can be dispensed with. Moreover, the cooling fluid can be introduced into individual annulus sectors via the pipe in a directed manner. By the same token, individual annulus sectors can also be increasingly supplied with cooling fluid by cooling fluid increasingly flowing out of the pipe specifically in certain areas, possibly by more outlet openings being provided per length in an annulus sector in question.

The pipe which is designed as a distribution pipe in the annular passage is fluidically connected to at least one cooling fluid feed line for cooling fluid feed and has a multiplicity of outlet openings which are designed for the transfer of cooling fluid from the pipe by flowing out into the annular passage.

The cooling fluid is advantageously compressor air but can also be a fluid of an external source which would be compressed, for example. Such fluids are for example air-water mixtures or air-steam mixtures.

A basic idea of the present invention is to be seen in the integration of a pipe into the annular passage which is subdivided by means of annulus sectors, which pipe is fluidically connected to at least one cooling fluid feed line of cooling fluid feed and so can be fed with cooling fluid. Instead of a direct feed of the sectors of the annular passage with cooling fluid, the pipe which is integrated into the annular passage is therefore first of all fed with cooling fluid, wherein the transfer of cooling fluid from the pipe into the sectors of the annular passage is enabled by means of a multiplicity of outlet openings in, or on, the pipe.

Whereas, therefore, a feed of the annular passage with cooling fluid sometimes forms a disadvantageous flow for forming a locally uniform cooling fluid distribution, by providing the pipe which is formed as a distribution pipe the cooling fluid can be guided in a largely controlled and directed manner into the annulus sectors of the annular passage, and advantageously to those casing parts which have an increased cooling air requirement. By the same token, it is possible, with a uniform distribution of the outlet openings in the pipe, to achieve a largely homogenous feed of the annular passage with cooling fluid without, for example, convection disturbances also having to be taken into consideration. In this way, a largely homogenous feed of the relevant casing parts of the annular passage can be achieved so that warping or uneven thermal expansion of individual casing parts of the gas turbine can be avoided in the main. This in turn has the advantageous consequence that the described gap distances in the gas turbine are formed comparatively uniformly, and a gap optimization over the entire circumferential shape of the casing parts can be undertaken. Furthermore, a particularly efficient operation of the gas turbine is made possible as a result.

The invention allows the cooling fluid to be first of all circumferentially distributed over the entire annular passage before the cooling fluid comes into direct thermal contact with the metal components of the annular passage of the gas turbine. On account of the more uniform transfer of heat quantity from the casing parts to the cooling fluid, phenomena such as ovalizaion or warping of the entire casing can be avoided.

At this point, it is to be noted that the pipe, which is designed as a distribution pipe, is to be understood in the sense of a flow guide which allows a directed and enclosed flow to be formed. For this, the pipe has a pipe wall which serves as a flow boundary. As a result, a pipe cross section, which determines the flow of the cooling fluid, can also be defined. The geometry of the pipe cross section does not have to be of round design in this case, but it is this, however, in an advantageous embodiment. The pipe cross section can for example also be rectangular or oval, or locally different, so that the pipe can be adapted for example to the local requirements of the annular passage. By the same token, it is conceivable that the pipe is designed as a corrugated tube. The pipe typically comprises a thermosetting metal alloy.

According to an advantageous embodiment of the invention, it is provided that the pipe extends in the main over the entire circumference of the annular passage and the outlet openings are preferably equally spaced apart in the circumferential direction. The outlet openings are typically at distances of a few centimeters from each other. Similarly, provision can be made for individual groups of outlet openings which are distributed over the circumference of the pipe or of the annular passage. Owing to this distribution of the outlet openings, a comparatively uniform feed of the annular passage with cooling air can be achieved, wherein those casing parts which without provision of the pipe would be subjected to more intense thermal heating can also advantageously be cooled.

According to a further embodiment of the invention, it is provided that the flow cross section of the pipe is of variable design, wherein in particular the flow cross section of the regions of the pipe which are arranged closer to the cooling fluid feed line is larger than those regions which are arranged comparatively further away from said cooling fluid feed line. Consequently, the flow velocity of the cooling fluid in the pipe can be variably adapted so that the residence time and flow rate of cooling fluid or the local static pressures can be adapted accordingly. As a result, the effect can be achieved, for example, of there still being a sufficient quantity of cooling fluid in the regions of the pipe which are arranged comparatively further away from the cooling fluid feed line despite continual loss of cooling fluid via the outlet openings.

According to a further embodiment of the gas turbine according to the invention, it is provided that the pipe is provided with a multiplicity of cooling fluid feed lines which are especially equally spaced apart in the circumferential direction. According to the embodiment, a further homogenization of the feed of the pipe with cooling fluid can therefore be achieved. Moreover, the required pipe diameter can be reduced.

According to a further embodiment of the invention, it is provided that the outlet openings are designed as holes which in their diameter in cross section especially have a measurement which is not larger than 30 mm. Advantageously, the cross sections have a measurement which is not smaller than 0.5 mm either. The design of the outlet openings as holes enables a particularly simple manufacture of the pipe which comprises the outlet openings. If the measurement of the holes is not larger than 30 mm in diameter with regard to their cross section, a directed cooling air flow toward the casing components of the annular passage can also be achieved, as a result of which an additional cooling effect by means of impingement cooling can be achieved.

According to a further aspect of the present invention, it is provided that the pipe has a cross section perpendicularly to the circumferential direction which is not larger than 40 cm, especially not larger than 25 cm in diameter. Advantageously, the diameter is not smaller than 1 cm either. The pipe cross section defines a pipe volume which is suitable for cooling air to be received at different pressures and to flow to the outlet openings in order to then allow the cooling fluid to flow from the outlet openings over into the annular passage. The cross section of the pipe is of sufficiently small dimension so that even in the case of low pressures a directed flow is formed on account of pressure differences in the pipe.

According to a further particular embodiment of the invention, it is provided that the pipe has a wall which is not larger than 8 mm perpendicularly to the circumferential direction. Preferably, the wall is not smaller than 0.5 mm. If the pipe is made specifically from a metal material, as will usually be the case, the pipe itself has only a low thermal capacity, and does not in the main lead to a distortion of the temperature distribution of the cooling fluid which discharges from the outlet openings.

According to a further embodiment of the invention, it is provided that the pipe is designed as a double-walled pipe. In this respect, the inner volume of the pipe can be thermally decoupled from the outer regions of the pipe, as a result of which a greater homogenization of the working fluid which discharges from the pipe with regard to its temperature can be carried out in turn.

Furthermore, it is possible that the pipe is also provided with a thermal insulation layer. The thermal insulation layer can be applied both internally and externally. This thermal insulation layer also serves in turn for a homogenization of the temperature distribution over the pipe in order to therefore largely avoid different heating rates of the cooling fluid through the pipe itself.

According to a particular embodiment of the invention, it is provided that the partitions separate at least individual adjacent annulus sectors, especially all the adjacent annulus sectors, from each other in a fluidtight manner. A temperature transfer as a result of free convection cells, which can spread over more than one annulus sector, can therefore be largely prevented. In this respect, the temperature stratifications or the temperature distribution in an individual annular passage can again be localized better. Depending on design of the annulus sectors, i.e. on the size and geometry of the annulus sectors, the ensuing temperature distribution in the circumferential direction can therefore be influenced in a particularly advantageous manner.

Alternatively, or even in continuation of the idea, it is provided that at least some of the annulus sectors, especially all of the annulus sectors, are provided with a separate cooling fluid feed line. Especially if the individual annulus sectors are separated from each other in a fluidtight manner, such an individual cooling fluid feed line per annulus sector is very advantageous or even necessary in order to supply the annulus sectors with sufficient cooling fluid. As a result of an individual cooling fluid feed line, each annulus sector can even be supplied with cooling fluid independently of the other annulus sectors, wherein annulus sectors can especially be supplied with a specific amount of cooling fluid when these are arranged in a region which during operation of the gas turbine demands a specific amount of cooling capacity.

According to a further, very advantageous embodiment of the invention, it is provided that at least individual partitions, especially all the partitions, have passages with a cross section Q in each case. The dimension of a cross section is in this case an average dimension which can be calculated for example as an average diameter. The dimension, however, can especially also be related to a maximum dimension in the cross-sectional plane, for example the maximum diameter. By the provision of passages in the partitions, cooling fluid can partially be exchanged between the annulus sectors. Depending on the size of the cross section of the individual passages, a specific transfer of cooling fluid between the individual annulus sectors can therefore be achieved. In this case, the individual partitions of the annulus sectors do not require to have passages of equal cross-sectional size in each case. Rather, the individual partitions can have passages of different size so that depending on the location of the annulus sector in the annular passage a larger or smaller fluid exchange quantity can be exchanged with the adjacent annulus sectors.

According to a particular embodiment of the invention, it is provided that at least individual partitions, advantageously all the partitions, are designed as separating plates. The separating plates are typically also referred to as partitioning plates. Since inside the annular passage typically no large pressure differences prevail, or no such pressure differences are to be established either between the individual annulus sectors, the partitions can be of comparatively thin-walled design. This in turn allows the subdivision of the annular passage into annulus sectors with the aid of simple and inexpensive components.

According to a further embodiment of the invention, it is provided that the annulus sectors in the circumferential direction of the annular passage have in the main an equal length dimension. According to this embodiment, the cooling fluid distribution in the individual annulus sectors is carried out relatively comparably. Moreover, it is not normally necessary to specifically adapt the individual annulus sectors with regard to their cooling fluid feed line. In the case of relatively high fluid flows, a quick homogenization of the cooling fluid distribution over the annular passage can therefore also be achieved.

According to a further embodiment of the invention, it is provided that provision is made for an even number of annulus sectors in the circumferential direction of the annular passage. There are particularly two, four, six or eight annulus sectors. This subdivision allows the subdivision of the annular passage into annulus sectors which can be arranged symmetrically to each other. This in turn allows an improved homogenization of the temperature distribution inside the four or eight annulus sectors.

According to a further embodiment of the invention, it is provided that at least one partition is provided in the region of the upper extremity of the annular passage and/or at least one partition is provided in the region of the lower extremity of the annular passage. With the gas turbine installed, the upper extremity refers in this case to the locally highest point of the annular passage, wherein the lower extremity refers to the lowest point. On account of the subdivision according to the embodiment, a spread of the free convection cells into the respectively other symmetry region can be prevented. On account of the symmetrical arrangement of the partitions, the annulus sectors can be fed with cooling fluid in a largely uniform manner, wherein the forming of the free convection cells or cooling fluid flow is also largely comparable, providing the partitions which are referred to are the only ones.

According to a similarly advantageous embodiment, it is provided that provision is made for at least two partitions which are arranged opposite each other in the circumferential direction of the annular passage and are especially arranged in a rotated manner in relation to the upper extremity of the annular passage by an amount of 85° to 95° (that is to say approximately by $\pi/2$). The definition of the upper and lower extremities is to be understood in accordance with the preceding embodiment.

According to a further embodiment of the invention, it is provided that the partitions are designed as retaining plates by means of which the pipe is fastened in the annular passage.

As a result, the partitions also have a mechanical function in addition to their fluidic function. Moreover, such plates are to be produced inexpensively and are very light.

Embodiments of the invention shall be described in detail below with reference to individual figures. In this case, reference is to be made to the fact that the figures are to be understood purely schematically and a limitation of the feasibility on account of this representation is not provided.

Reference is also to be made to the fact that all technical features with the same designations have the same technical effect.

Furthermore, reference may be made to the fact that all optional combinations of the subsequently shown technical features are currently claimed providing these combinations are in a position to achieve the objects according to the invention.

DETAILED DESCRIPTION OF INVENTION

Figure 1:
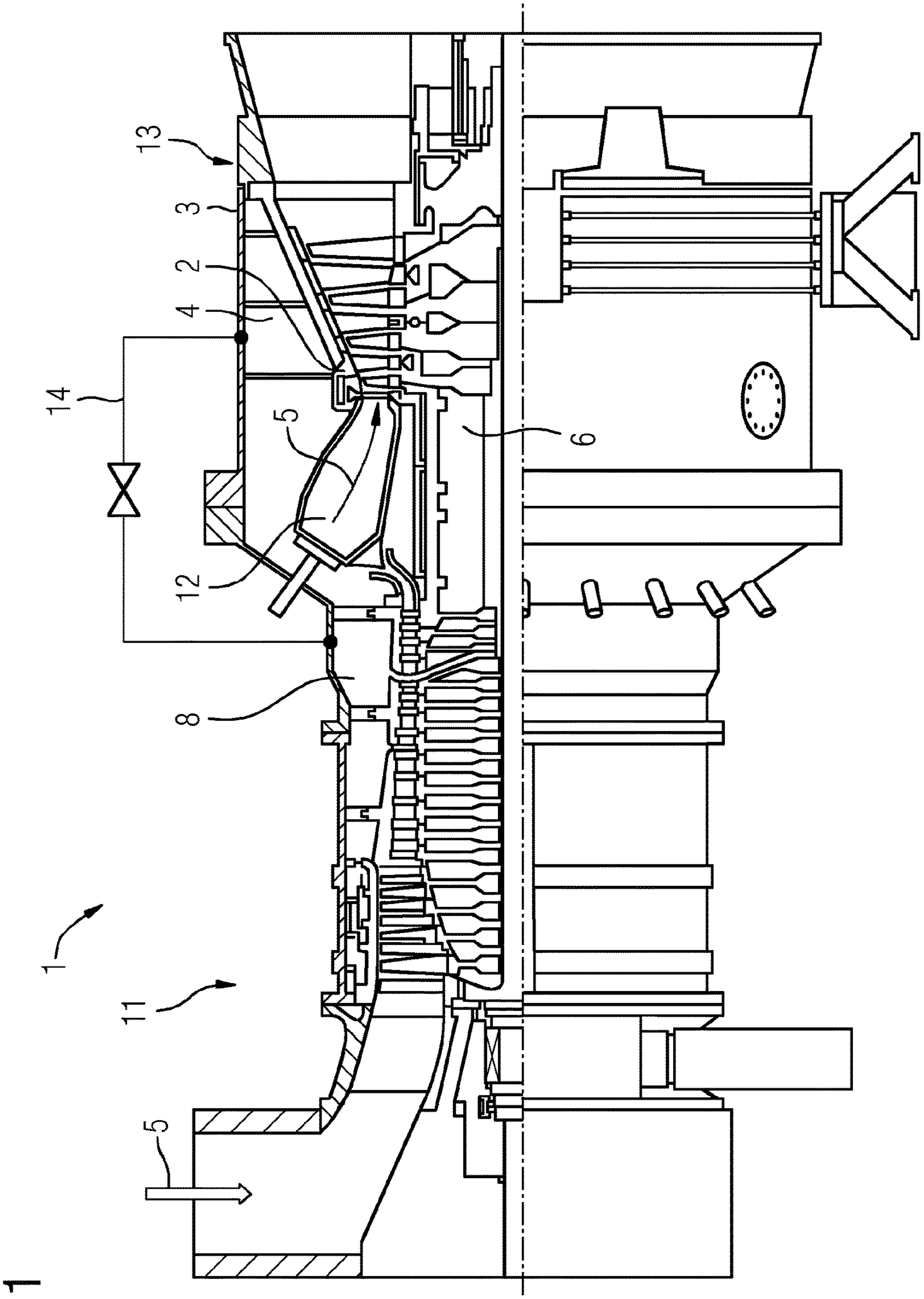
FIG. 1 shows a sectional view from the side in the longitudinal direction through a gas turbine according to the prior art.

FIG. 1 shows a sectional view from the side in the longitudinal direction through an embodiment of a gas turbine as is known from the prior art. Here, the gas turbine has a compressor 11 which during operation inducts and compresses working fluid 5, that is to say air in the present case. The compressed working fluid 5 is for the most part fed to the combustion chamber 12 for combusting, wherein, however, a small proportion of compressed working fluid 5 in the sense of a cooling fluid 8 is fed to a plenum, which is not additionally provided with a designation, from which this cooling fluid 8 is fed via a secondary fluid line 14 to an annular passage 4. The annular passage 4 is delimited toward the environment by means of an outer casing part 3 and, on the inside, toward the gas turbine rotor 6 by means of an inner casing part 2. In the longitudinal direction of the gas turbine, provision is also made for additional components which form a fluidically delimited annular passage 4.

During operation of the gas turbine, working fluid is subsequently introduced into the annular passage 4 and, depending on the operating state, can form a larger or smaller flow in the annular passage. The cooling fluid is extracted from the annular passage for further cooling or for sealing purposes, for example. Depending on the operating state of the gas turbine 1, however, the components which delimit the annular passage 4 are heated to a greater or lesser extent. Similarly, those components which are supplied and cooled by means of the cooling fluid 8 which is discharged from the annular passage 4 can be heated to a greater or lesser extent. In both cases, an uneven cooling effect as well as warping or ovalization of the gas turbine are to be feared, as a result of which efficiency is forfeited as already explained further up.

Figure 2:
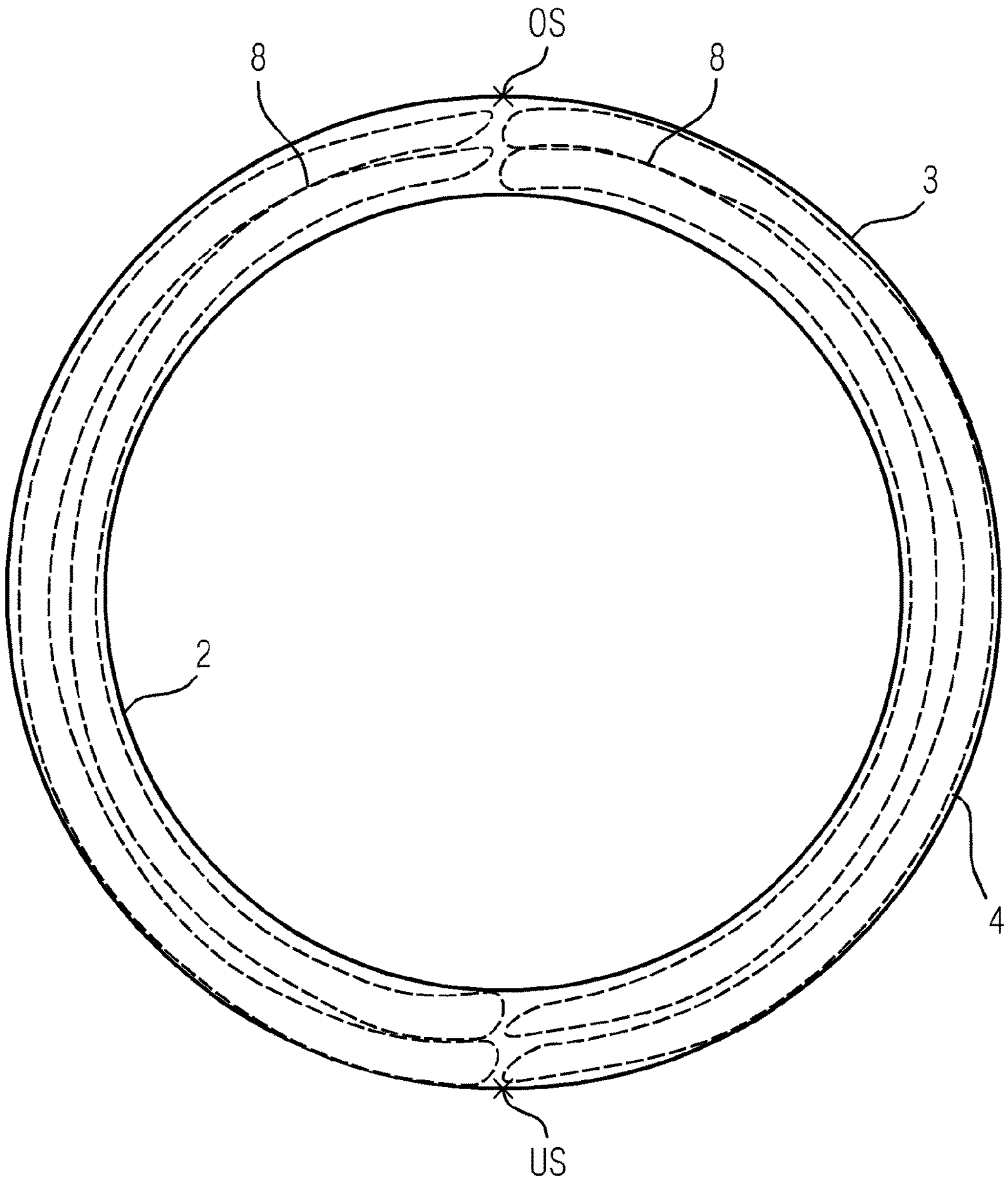
FIG. 2 shows a cross-sectional view through an annular passage in the longitudinal direction along a gas turbine as is known from the prior art.

On account of the uneven heating, as well as sometimes on account of an insufficiently large quantity of cooling fluid 8 introduced into the annular passage 4, relatively large free convection cells can form in the cooling fluid 8 in the annular passage 4, as shown in FIG. 2. These convection cells are shown by dashed lines in the present case. In this case, a free convection cell reaches from a lower extremity point US of the annular passage 4 up to an upper extremity point OS and therefore impairs the entire fluid flow of cooling fluid 8 in the annular passage 4. As a consequence of the forming of the free convection cells, moreover, a disadvantageous temperature distribution occurs inside the annular passage, particularly when only a small cooling fluid quantity 8 exists in the annular passage 4. On account of the flow influences which are brought about as a result of the free convection cells, sometimes not all the regions are sufficiently supplied with a cooling fluid 4 of comparable thermal conditioning. By the same token, cooling fluid 8 can be extracted from the annular passage at predetermined points (not shown in the present case), which cooling fluid can vary with regard to its temperature over the circumferential angle. All this needs to be avoided.

Figure 3:
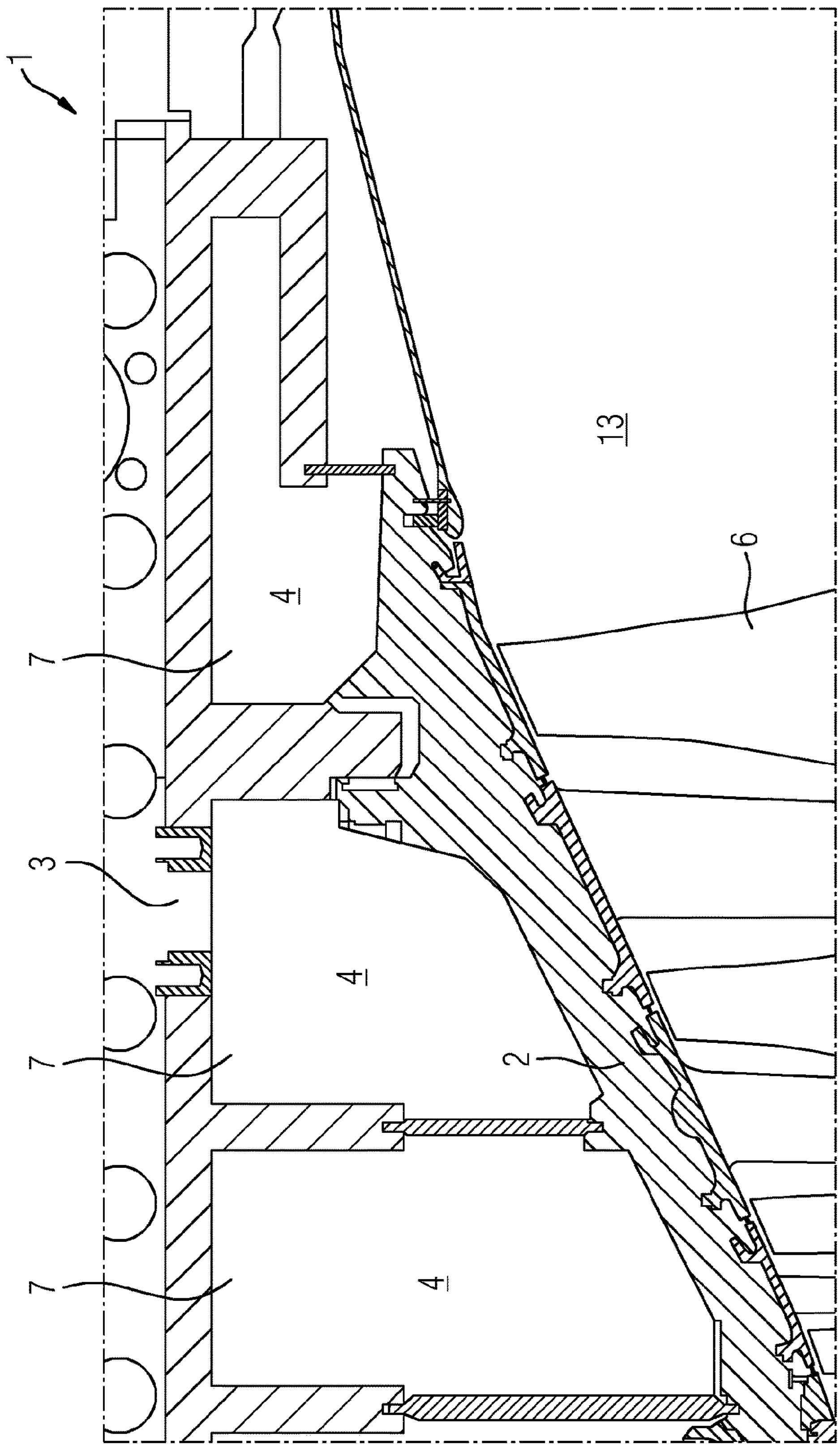
FIG. 3 shows a sectional view from the side in the longitudinal direction through an embodiment of a gas turbine as is known from the prior art.

This can be achieved for example by means of the embodiment shown in FIG. 3. In this case, FIG. 3 shows in the longitudinal direction of the gas turbine 1 a detailed sectional view through altogether three annular passages 4 which are subdivided in each case by means of a partition 7. The partitions 7 define annulus sectors 10, not additionally shown with a designation, (one in each case coming out of the plane of the paper, and one in each case lying behind the plane of the paper,—see also FIG. 4), and therefore enable the interruption or prevention of the forming of large free convection cells in the annular passage 4. The annulus sectors 10 in this case are especially delimited toward the environment by means of the outer casing part 3 and are delimited toward the rotating components of the expansion turbine 13 by means of the inner casing part 2. Since the inner casing parts 2 are heated up more quickly on account of the hot gas flow which is expanded in the expansion turbine 13, these components are also to be acted upon by cooling fluid to an increasing extent.

Figure 4:
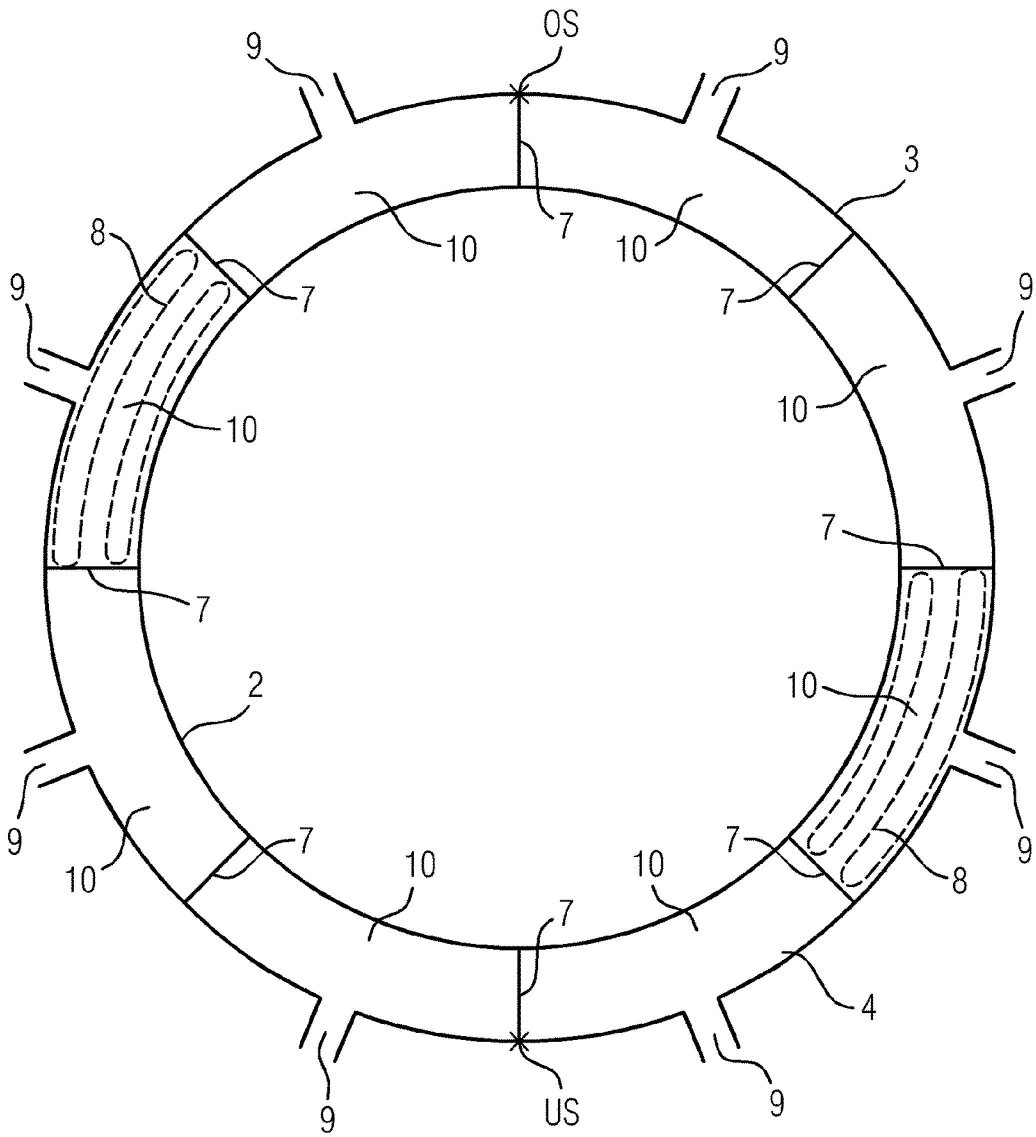
FIG. 4 shows a cross-sectional view through an annular passage in the longitudinal direction along a gas turbine as is known from the prior art.

FIG. 4 shows a further embodiment of an annular passage 4 of gas turbine 1, which is known from the prior art, in a cross-sectional view along the longitudinal direction of the gas turbine, which annular passage 4 is uniformly subdivided in each case into individual annulus sectors 10 by means of partitions 7. The individual annulus sectors 10 are seen here in each case with a separate cooling fluid feed line 9 via which the individual annulus sectors can be supplied with cooling fluid 8.

Also in the presently depicted embodiment, individual free convection cells are formed in the cooling fluid 8 which, however, remain limited to the individual annulus sectors 10. As a result, on the one hand a quicker mixing-through of the volume of the annulus sectors 10 can be achieved, moreover a quicker heat transfer to the inner casing part 2 can be achieved since in the annulus sector 10 the flow is on a smaller scale. On account of the partitions 7, the annular passage 4 can therefore be subdivided provided that all regions can be largely supplied with cooling fluid in a comparatively uniform manner. This requires a uniform temperature distribution especially of the inner casing part 2, as a result of which distortion or ovalization of the gas turbine 1 can be largely avoided. In this case, it may be necessary to supply the individual annulus sectors 10 with different quantities of cooling fluid 8 in each case via the cooling fluid feed lines 9. Similarly, different quantities can be extracted again from the respective annulus sectors 10 (not shown in the present case).

Figure 5:
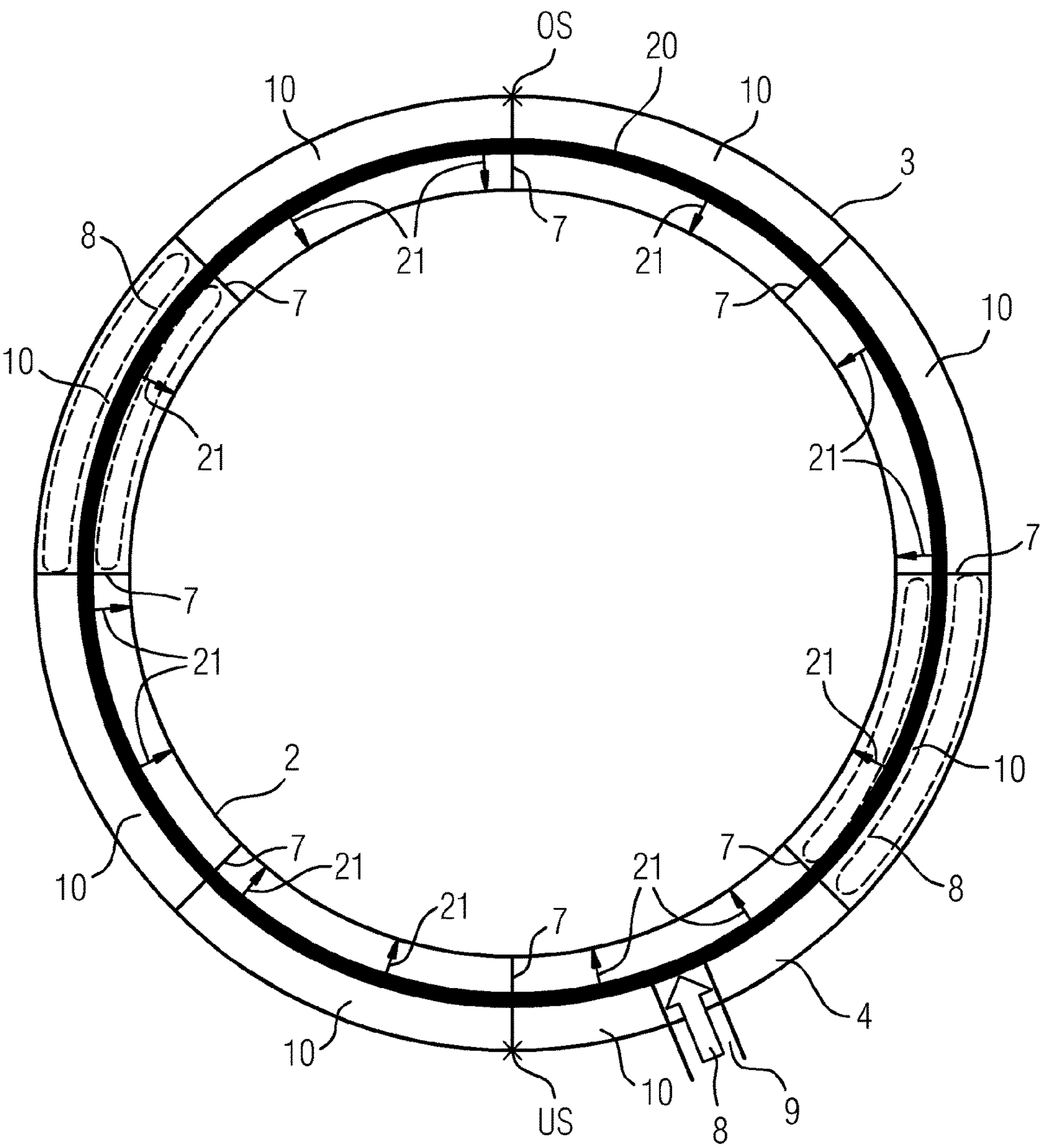
FIG. 5 shows a cross-sectional view through an annular passage in the longitudinal direction along a gas turbine according to an embodiment of the invention.

FIG. 5 shows an embodiment of the invention which differs from that shown in FIG. 4 to the extent that for further homogenization of the cooling fluid introduction into the individual annulus sectors 10 provision is made for a pipe 20, designed as a distribution pipe, which extends through all the annulus sectors and via outlet openings 21 transfers the cooling fluid from the interior of the pipe into the individual annulus sectors 10 in each case. The pipe 20, which is designed as a distribution pipe, is itself fed via a cooling fluid feed line 9 with cooling fluid 8. On account of the comparatively smaller flow cross section of the pipe 20, a better oriented flow can be formed in the pipe 20 than in the annular passage 4. Consequently, the cooling fluid 8 in the pipe 20 is sometimes distributed better and more quickly. Moreover, the pressure in the pipe 20 can be increased in comparison to the pressure in the individual annulus sectors 10, as a result of which the transfer of cooling fluid 8 into the individual annulus sectors is determined in the first instance by the pressure drop, and not as a result of possible free convection phenomena in the individual annulus sectors 10.

Figure 6:
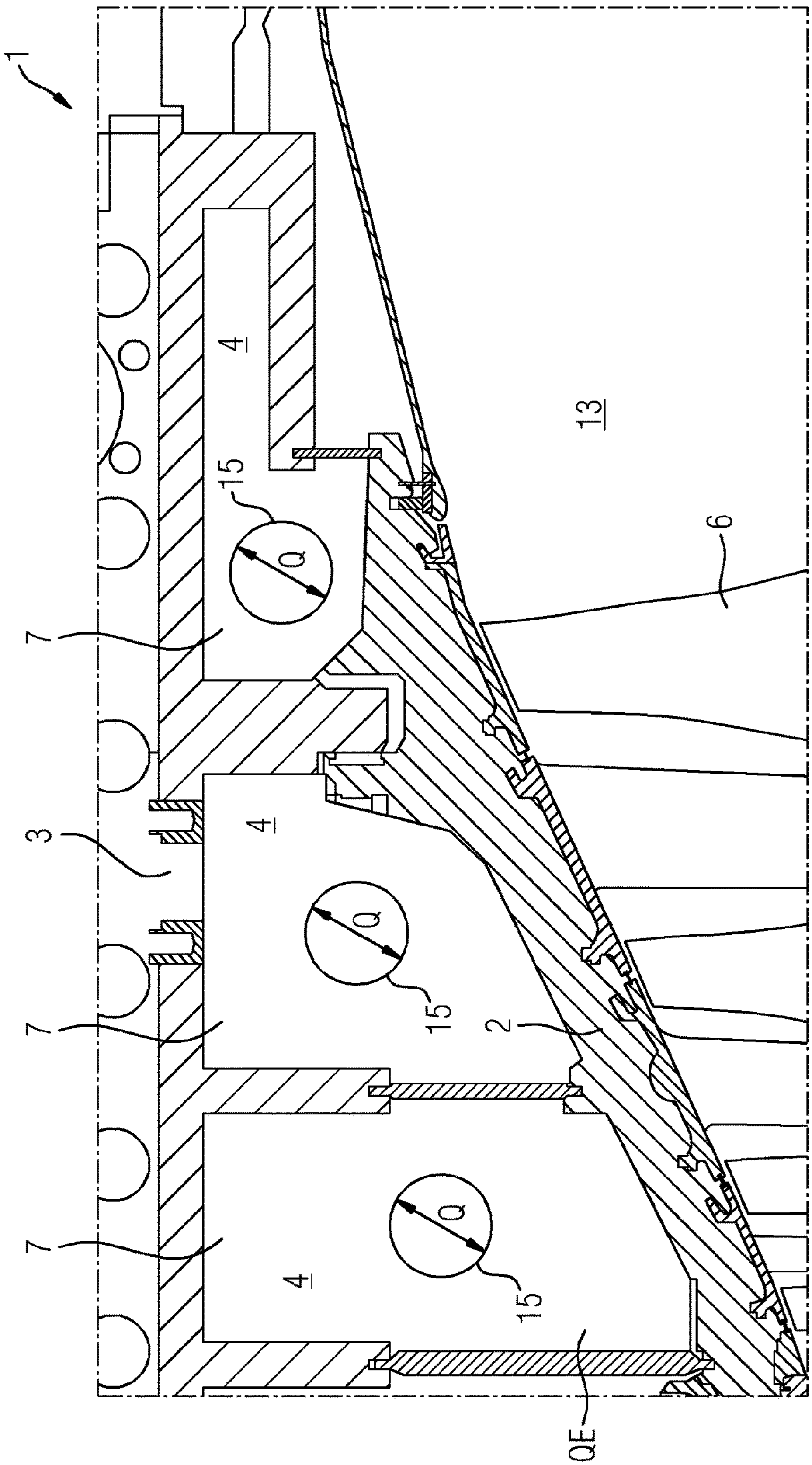
FIG. 6 shows a sectional view from the side in the longitudinal direction through an embodiment of a gas turbine which has no pipe and is not claimed in the present case.

According to a further embodiment, which has no pipe 20, it is conceivable, as shown in FIG. 6, to provide the individual partitions 7 of the annular passages 4 with a penetration 15 in each case. The penetration 15 can be designed as a hole, for example, and has a cross-sectional diameter Q in the cross-sectional plane QE which is defined by the planar extension of the partition 7. Via the individual penetrations 15, the annular passages 10 can in each case be in fluid contact with each other so that a cooling fluid exchange can be enabled when required. Depending on the dimensioning of the size of the penetration 15, a larger or smaller quantity of cooling fluid can be exchanged between the adjacent annulus sectors 10 and can therefore contribute to a homogenization of the temperature distribution in the respective annular passage 4.

Further embodiments result from the dependent claims.

The invention claimed is:

1. A gas turbine comprising:

at least one inner casing part and at least one outer casing part, between which both casing parts is at least partially arranged an annular passage which circumferentially encloses an useful flow of a working fluid, which prevails during operation of the gas turbine, and a gas turbine rotor, wherein the annular passage is designed to direct a cooling fluid in the circumferential direction, wherein the annular passage is fluidically subdivided into annulus sectors in the circumferential direction by partitions, designed as separating plates, which are adapted to prevent a free, unhindered fluid exchange between the individual annulus sectors, wherein provision is made at least partially in the annular passage for a pipe which fluidically interconnects individual annulus sectors, wherein the pipe is designed as a distribution pipe which is fluidically connected to at least one cooling fluid feed line for cooling fluid feed and has at least one outlet opening, which is designed for the transfer of cooling fluid from the pipe into the annulus sectors.

2. The gas turbine as claimed in claim 1, wherein the partitions separate at least individual adjacent annulus sectors from each other in a fluidtight manner.

3. The gas turbine as claimed in claim 1, wherein at least some of the annulus sectors are provided with a separate cooling fluid feed line.

4. The gas turbine as claimed in claim 1, wherein at least individual partitions have penetrations with a cross section in each case.

5. The gas turbine as claimed in claim 1, wherein the annulus sectors have an equal length dimension in the circumferential direction.

6. The gas turbine as claimed in claim 1, wherein an even number of annulus sectors are provided in the circumferential direction.

7. The gas turbine as claimed in claim 1, wherein at least one partition is provided in the region of the upper extremity of the annular passage and/or at least one partition is provided in the region of the lower extremity of the annular passage.

8. The gas turbine as claimed in claim 1, wherein provision is made for at least two partitions which are arranged opposite each other in the circumferential direction of the annular passage.

9. The gas turbine as claimed in claim 1, wherein the partitions are designed as retaining plates, by which the pipe is fastened in the annular passage.

10. The gas turbine as claimed in claim 1, wherein the cooling fluid comprises compressor air.

11. The gas turbine as claimed in claim 1, wherein the distribution pipe has a multiplicity of outlet openings which are designed for the transfer of cooling fluid from the pipe into the annulus sectors.

12. The gas turbine as claimed in claim 8, wherein the at least two partitions are arranged in a rotated manner in relation to the upper extremity of the annular passage by an amount of 85° to 95°.

13. The gas turbine as claimed in claim 1, wherein the partitions separate all the adjacent annulus sectors from each other in a fluidtight manner.

14. The gas turbine as claimed in claim 1, wherein all of the annulus sectors are provided with a separate cooling fluid feed line.

15. The gas turbine as claimed in claim 1, wherein all of the partitions have penetrations with a cross section in each case.

* * * * *